(12) United States Patent
Harris, Sr.

(10) Patent No.: US 10,123,490 B2
(45) Date of Patent: Nov. 13, 2018

(54) BOTTOMLESS IN-GROUND WATER CONSERVATION AND CONTAMINATION PREVENTION GARDEN-PLANT WATERING-WELL

(71) Applicant: Donald Eugene Harris, Sr., Cedar Park, TX (US)

(72) Inventor: Donald Eugene Harris, Sr., Cedar Park, TX (US)

( * ) Notice: Subject to any disclaimer, the term of this patent is extended or adjusted under 35 U.S.C. 154(b) by 97 days.

(21) Appl. No.: 14/866,845

(22) Filed: Sep. 26, 2015

(65) Prior Publication Data
US 2017/0086385 A1    Mar. 30, 2017

(51) Int. Cl.
*A01G 13/04* (2006.01)
*A01G 13/02* (2006.01)

(52) U.S. Cl.
CPC .......... *A01G 13/04* (2013.01); *A01G 13/0237* (2013.01)

(58) Field of Classification Search
CPC ...... A01G 13/04; A01G 13/0237; A01G 9/02; A01G 9/021; A01G 9/10; A01G 9/102
USPC ........ 47/19.1, 19.2, 65, 65.5, 66.1, 66.7, 69, 47/87; D11/143, 152, 153, 154, 164
See application file for complete search history.

(56) References Cited

U.S. PATENT DOCUMENTS

| | | | | |
|---|---|---|---|---|
| 4,803,806 | A * | 2/1989 | Ito | A01G 9/00 248/27.8 |
| 6,360,484 | B1 * | 3/2002 | Kreizel | A01G 9/02 47/30 |
| 6,748,696 | B1 * | 6/2004 | Davidson | A01G 1/042 435/254.1 |
| D717,200 | S * | 11/2014 | Thuma | D11/152 |
| 2002/0005011 | A1 * | 1/2002 | Goldberg | A01G 9/028 47/65.5 |
| 2009/0025290 | A1 * | 1/2009 | Trabka | A01G 9/026 47/66.7 |
| 2013/0160361 | A1 * | 6/2013 | Keithly | A01G 9/02 47/66.7 |
| 2014/0196365 | A1 * | 7/2014 | Washington | A01G 9/124 47/66.6 |

* cited by examiner

*Primary Examiner* — William V Gilbert

(57) ABSTRACT

An in-ground plant container with watering-well that is open at both ends and is functional and decorative. The above ground portion in this present embodiment has a round bowl shaped water well and broad rounded lip for ease of gripping and placing in an appropriate sized hole. The bowl of the watering-well keeps the plant container above ground. The bottom, below ground portion, has vertical fins for lateral stability in the soil. This embodiment also has an outer horizontal flange at its base for prevention against vertical lifting due to soil movement and for permanent placement. The above ground portion of the plant container watering-well can be wider than the base and replaces the organic soil-watering-well. This in-ground plant container with watering-well is for conserving water, and the containment of water contaminated by pesticides, herbicides, and fertilizers.

1 Claim, 5 Drawing Sheets

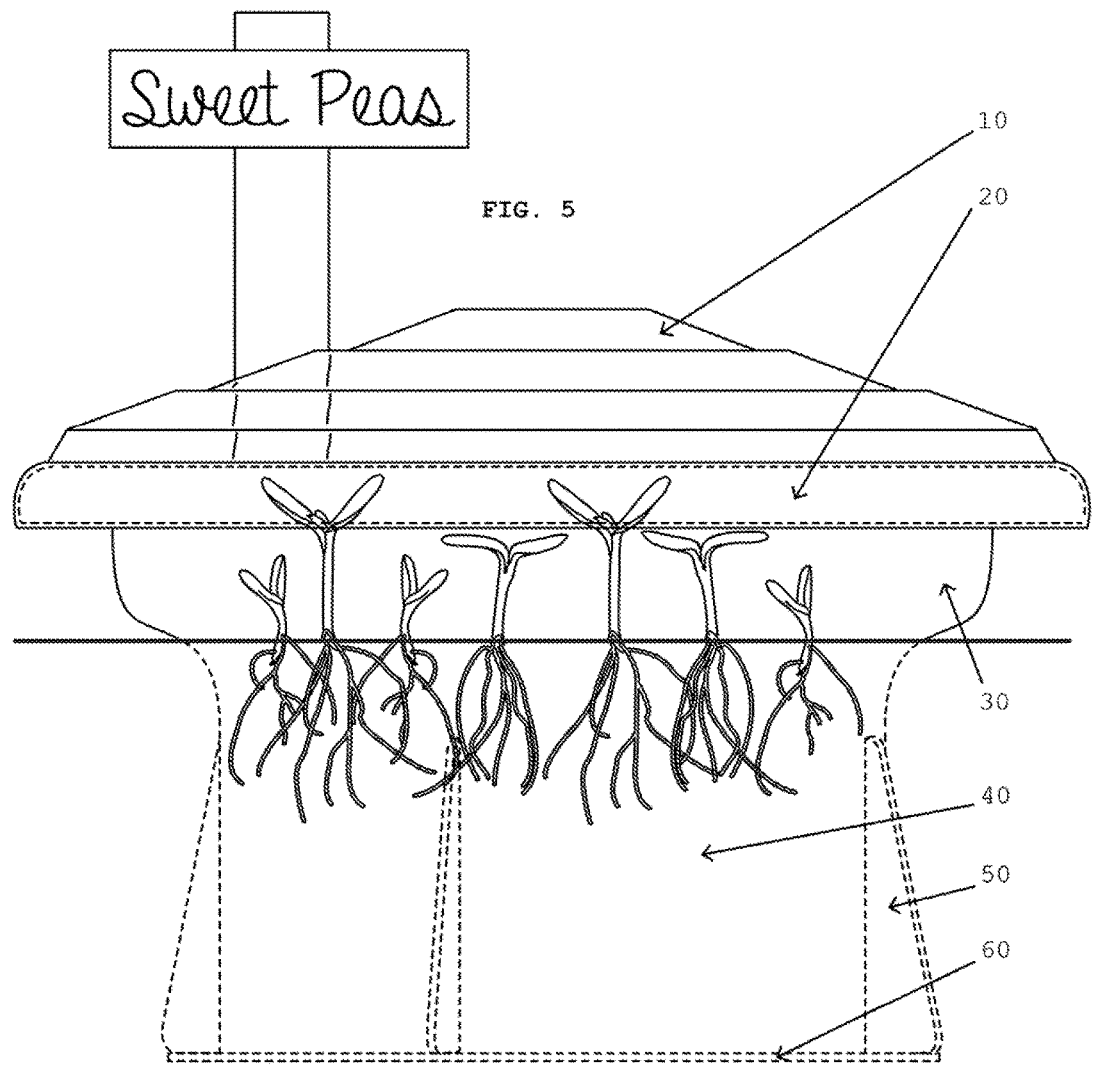

BOTTOMLESS IN-GROUND WATER CONSERVATION AND CONTAMINATION PREVENTION GARDEN-PLANT WATERING-WELL

FIELD OF THE INVENTION

This present embodiment relates to bottomless garden plant containers and, more particularly, to a bottomless garden plant container that conserves water and prevents unwanted water waste, including the prevention of pesticide, herbicide, and fertilizer contamination due to uncontrolled water runoff.

BACKGROUND

Every day there is someone somewhere watering a plant in their garden; and along with them are the gardening enthusiasts, who out of love for their little botanical friends, are diligently applying fertilizers, pesticides, and herbicides. One outcome these well-meaning groups have in common is this: more-often-than-not they watch helplessly as much of the needed water, and gardening additives, flow to surrounding areas and away from the plant for which they were intended. And in today's world water has become a commodity, and its conservation is of the utmost importance.

There have been attempts at correcting this seemingly universal problem for gardeners for many years. The most common solution was to build up a bowl-shaped mound of soil around the base of the plant, commonly referred to as a watering-well, to contain the water long enough for it to percolate down to the plant's roots. A few of the other solutions are the use of mulches piled around the plant in the hopes of retaining moisture, or stones sunk into the soil around the plant as a border, or to simply place the plant several inches below ground level.

Unfortunately, the aforementioned so-called solutions, along with many others fail soon after their implementation. Soil watering-wells absorb water laterally as well as gravitationally. The very act of watering erodes away the soil watering-well. And as the soil surface gets drier the water has less time to saturate before it becomes wasteful runoff and often, taking with it, gardening chemicals such as fertilizers, pesticides, and herbicides.

Mulch mounds are not much better at solving the issue—in fact, they can exacerbate the problem of garden chemical products like pesticides and herbicide runoff. Mulches are breeding grounds for pests like earwigs and pill-bugs to name a few, which encourages greater use of pesticides which then accumulates in the mulches; and mulches tend to float, and flow, with water runoff from over watering and large downpours of rain. These so-called solution failures are typical of the other solutions as well as those not mentioned. The worst consequence of these runoffs is the gardening chemicals used to help grow and protect our garden plants can end up flowing into street gutters, streams, ponds and other environmentally sensitive areas.

Although there are various methods of trying to prevent water and chemical runoff, all, or almost all suffer from one, or more than one disadvantage. Therefore, there is a need to provide methods and apparatus for improved and more secure methods for the prevention of wasteful water runoff, and the containment of useful gardening products, to prevent them from becoming a detriment and danger to their surrounding environments.

As long as there are plants and water there will be gardening, and gardening is here stay, and it can be done more effectively and environmentally friendly.

PRIOR ART

The following is a tabulation of some prior art that presently appears relevant:

I am aware of U.S. Pat. No. US 2009/0025290 A1, Jan. 29, 2009, Bottomless Plant Container which was issued to Ball Horticultural Company for growing plants in an open-bottom plant container.

I am, also aware of prior art U.S. Pat. No.: US 2002/0005011 A1 issued to Lauri and David Goldberg Jan. 17, 2002 Bottomless Compartmentalized In-Ground Garden Container.

SHORTCOMINGS OF OTHER SOLUTIONS

U.S. Pat. No. U.S. 2009/0025290 A1 Open-bottom plant container is a temporary biodegradable container for transporting rooted plants for placing in their final growing site. These products are designed as only temporary containers; whereas this present embodiment of the Bottomless In-Ground Water Conservation and Contamination Prevention Garden-Plant Watering-Well is for permanent use.

Also, it is neither taught nor suggested that U.S. Pat. No. US 2009/0025290 A1 Bottomless Plant Container is so designed as to conserve water and prevent the runoff of gardening chemicals or products.

U.S. Pat. No.: US 2002/0005011 A1: What is disclosed is a garden container that includes a rigid outer wall defining a perimeter and having opposite upper and lower edges around the perimeter. Its outer and inner circular walls and intersecting walls are designed to slice into the soil. It is neither taught nor suggested that this bottomless container is designed to conserve water and prevent the runoff of gardening chemicals or products. It is also stated that the "... container may be manually placed or depressed into the soil until the rim of the container is generally flush with the soil surface," (excerpt from Summary of the Invention).

Unfortunately, being flush with the soil allows for wasteful water runoff, chemical contamination of surrounding areas and the dispersion of other gardening products. This prior art bottomless garden container is subject to vertical movement, both upwards and downwards, which could result in all or portions of the container sinking below ground level and it is neither taught nor suggested that this device was designed to prevent that from happening.

ADVANTAGES OF PRESENT EMBODIMENT

Thus several advantages of one or more aspects would be to provide a bottomless in-ground plant container that conserves water via the use of a non-eroding watering-well.

Other advantages of one or more aspects are to provide a bottomless in-ground plant container watering-well that can be both decorative and functional.

It would further be advantageous to provide a bottomless in-ground plant container watering-well that helps protects its surrounding environments from harmful herbicides, pesticides, and fertilizer runoff.

It would also be advantageous to have a bottomless in-ground plant container watering-well that protects plants and flowers from grass trimmers above ground and help prevent unwanted weeds and grass rhizomes below ground.

It would further be advantages to have a bottomless in-ground plant container watering-well that encourages earthworm growth and population for plant and soil health.

It would also be advantages to have a bottomless in-ground plant container watering-well that directs water to flow downward to the plant's roots instead of flowing away from the roots and across the soil's surface.

These and other advantages of one or more aspects will become apparent from a consideration of the ensuing description and accompanying drawings.

SUMMARY OF THE INVENTION

In accordance with the present embodiment of the Bottomless In-Ground Water Conservation and Contamination Prevention Garden Plant Watering-Well, there is provided an in-ground plant container that is open at both ends. The above ground portion has a bowl-shaped watering-well and rounded rim for ease of gripping and placing in an appropriate sized hole. The rounded rim also offers protection and support for plant stalks. The below ground portion (barrel) has lateral fins for stability in the soil. This particular bottomless in-ground plant container watering-well embodiment includes an outer perpendicular flange at the base of the below ground barrel for: a) prevention against vertical lifting due to soil movement, b) for permanent placement. The above ground portion of this particular embodiment of the plant container watering-well's bowl is wider than the below ground barrel and replaces a soil watering-well and keeps the watering-well bowl safely above ground level and is sized so at to temporarily contain an appropriate amount of water. In another aspect of this embodiment an optional clear convex lid snaps on over the bottomless in-ground plant container watering-well bowl to create a mini-greenhouse for things such as: early starting of seedlings; or preservation of bulbs.

BRIEF DESCRIPTION OF THE DRAWINGS

A complete understanding of the present embodiment may be obtained by reference to the accompanying drawings, when considered in conjunction with the subsequent, detailed description, in which:

FIG. 5 is a front detail view of an embodiment of the plant container watering-well utilizing the clear plastic cover 10 as a mini-greenhouse.

For purposes of clarity and brevity, like elements and components will bear the same designations and numbering throughout the Figures.

DESCRIPTION OF THE PRESENT EMBODIMENT

Before this first embodiment of a Bottomless In-Ground Water Conservation and Contamination Prevention Garden-Plant Watering-Well, along with its methods are disclosed and described; it is to be understood that this first embodiment is not limited to the particular configurations, sizes, and materials disclosed herein as such configurations, sizes, and materials may vary somewhat. It is also to be understood that the terminology employed is used to describe this particular embodiment and is not intended to be limiting; however, for brevity's sake throughout the description, Bottomless In-Ground Water Conservation, and Contamination Prevention Garden-Plant Watering-Well, will be referenced simply as watering-well.

Figure 1A:
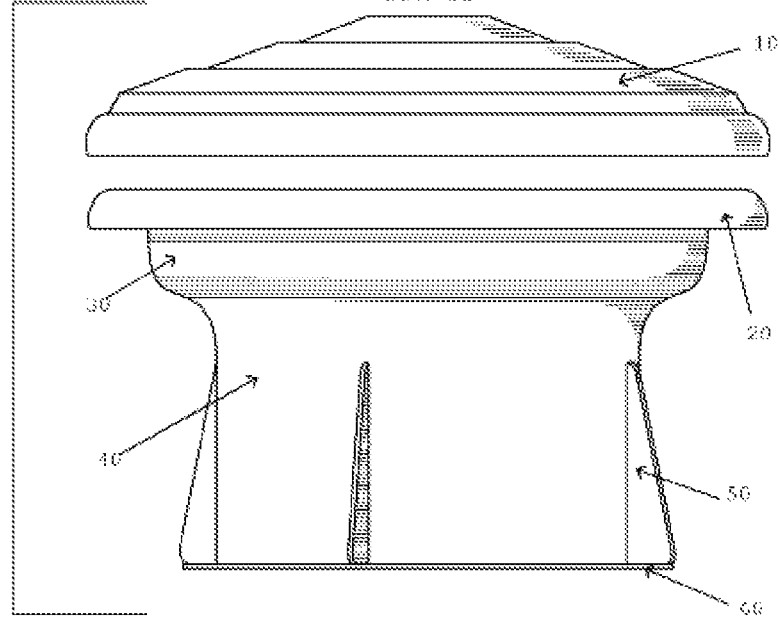
FIG. 1a-1b are front perspective views of a plant container watering-well embodiment with one aspect showing the use of a cover.
Figure 1B:
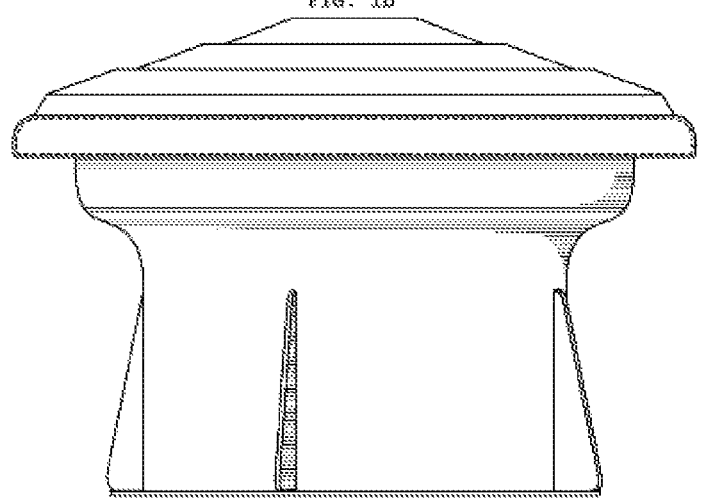

FIGS. 1a-1b are a front perspective views of a watering-well in accordance with the present embodiment. Watering-wells may be fabricated from plastics, metals or any other suitable materials. Moreover, the watering-well in this embodiment is circular, but in alternate embodiments, it can be shaped as a rectangle, square or any other geometrical shape or any organic shape or configuration deemed to be aesthetically pleasing or advantageous. This particular embodiment, save for the optional clear plastic cover 10 is of a single unified construction which will be apparent to those skilled in the art of plastic fabrication. Watering-wells can have their above-ground bowl 30 and rim 20 outer circumference greater than its below-ground barrel 40 circumference as in the case of this present embodiment. The width and height of the bowl 30 have a dual purpose, 1) for temporarily holding an appropriate volume of water for plants, 2) shield plants from grass trimmers and mowers during routine lawn maintenance.

An optional durable, flexible clear plastic cover 10 can be snapped on, and popped off the rim 20 to allow a person to start seeds, or place seedlings in a protected environment. The rim 20, is seamlessly attached to the top of the bowl 30 and extends up and out over the bowl 30 for ease of handling, placing in an appropriately sized hole, and strength. The rim 20 also works as an additional defense along with the bowl 30, to prevent the watering-well from sinking too, or below, the ground-level should an embodiment not incorporate a perpendicular flange 60 at the base of the barrel 40. The bowl 30 is the actual replacement for its organic counterpart the soil watering-well. The barrel 40 is the below-ground portion of the watering-well and is seamlessly attached to the bowl 30. Attached to the barrel 40 are evenly spaced lateral fins 50, these prevent lateral rotation in circular embodiments of the watering-wells. The perpendicular flange 60 is seamlessly attached to the base of the barrel's outer walls and the perpendicular flange 60 helps prevent vertical lifting or sinking of the watering-well due to soil movement.

Figure 2:
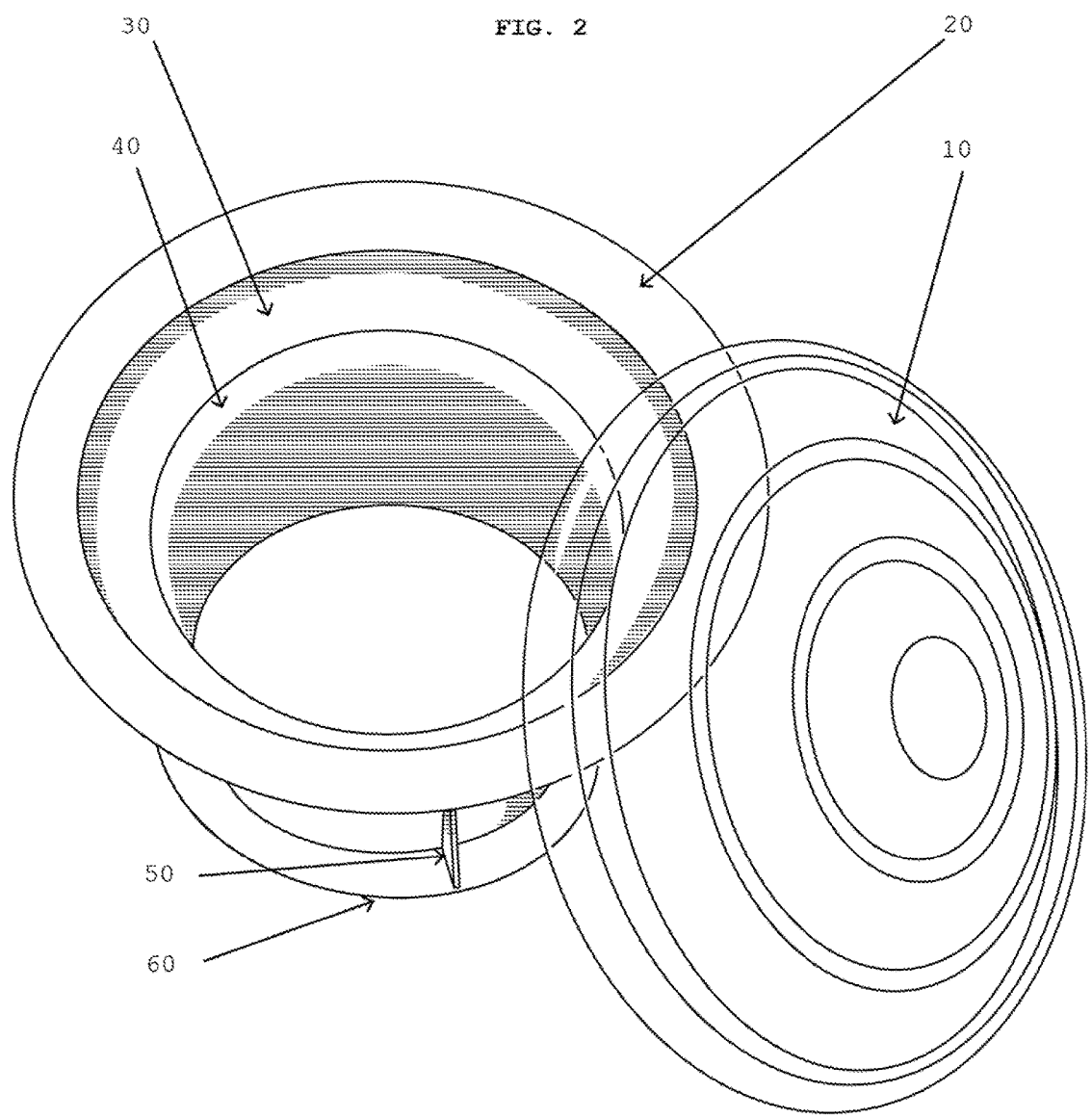
FIG. 2 is a top perspective view of a top perspective of one embodiment of a plant container watering-well with a bottom perpendicular flange.

FIG. 2 is a top perspective view and shows the present embodiment with the perpendicular flange 60. The perpendicular flange 60 works to help in the prevention of the watering-well from rising and sinking and for permanently placing watering-wells.

Figure 3:
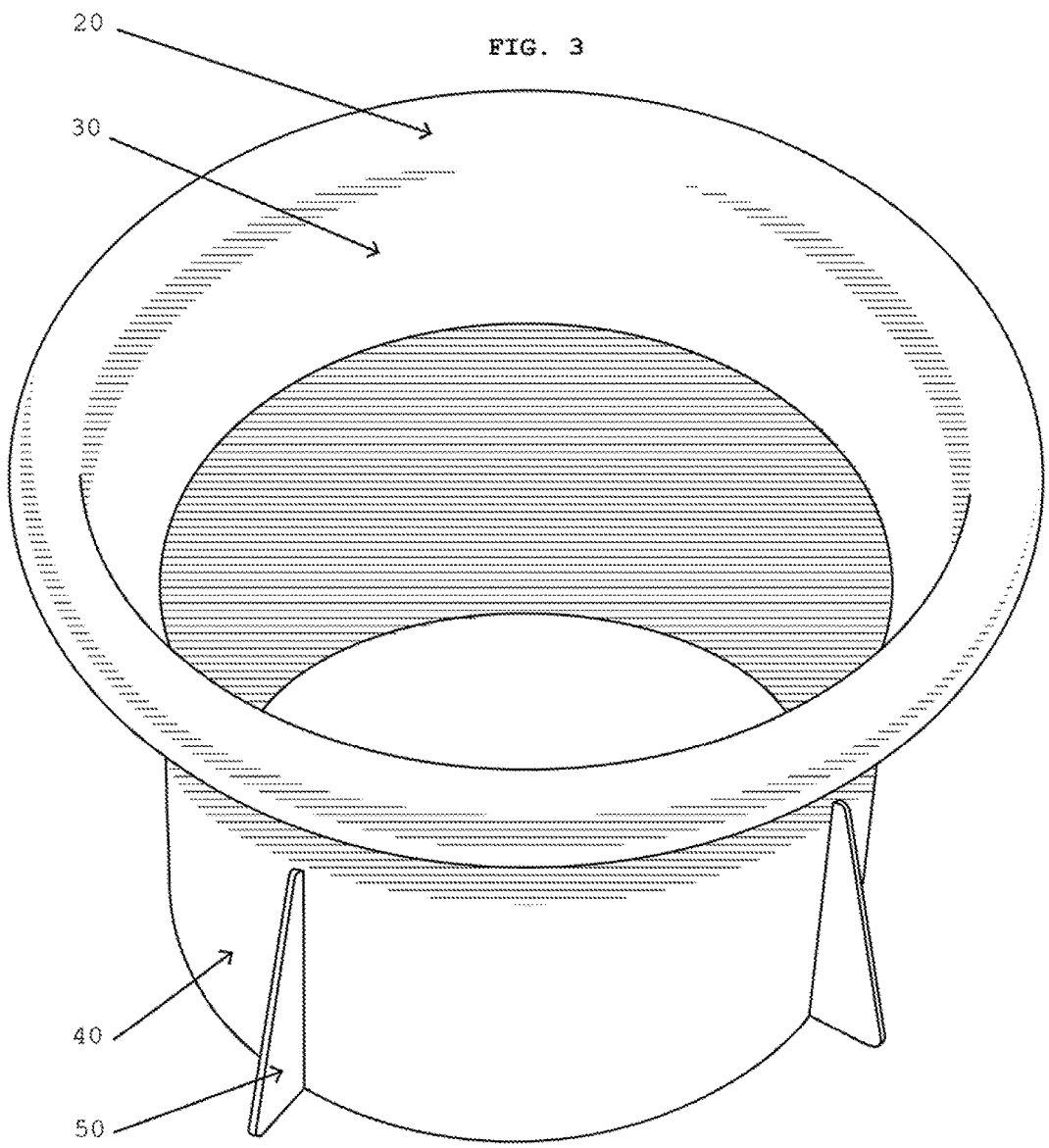
FIG. 3 is a top perspective view of an aspect of one embodiment plant container watering-well without a bottom perpendicular flange.

FIG. 3 is a top perspective view of a figure and shows an aspect of one embodiment without the perpendicular flange 60. This figure without the perpendicular flange 60 is for watering-well's placed in temporary planting areas. Watering-wells without the perpendicular flange 60 will have the bowl's outer circumference greater than the below-ground barrel's circumference to prevent the watering-well sinking too, or below the ground-level.

Figure 4:
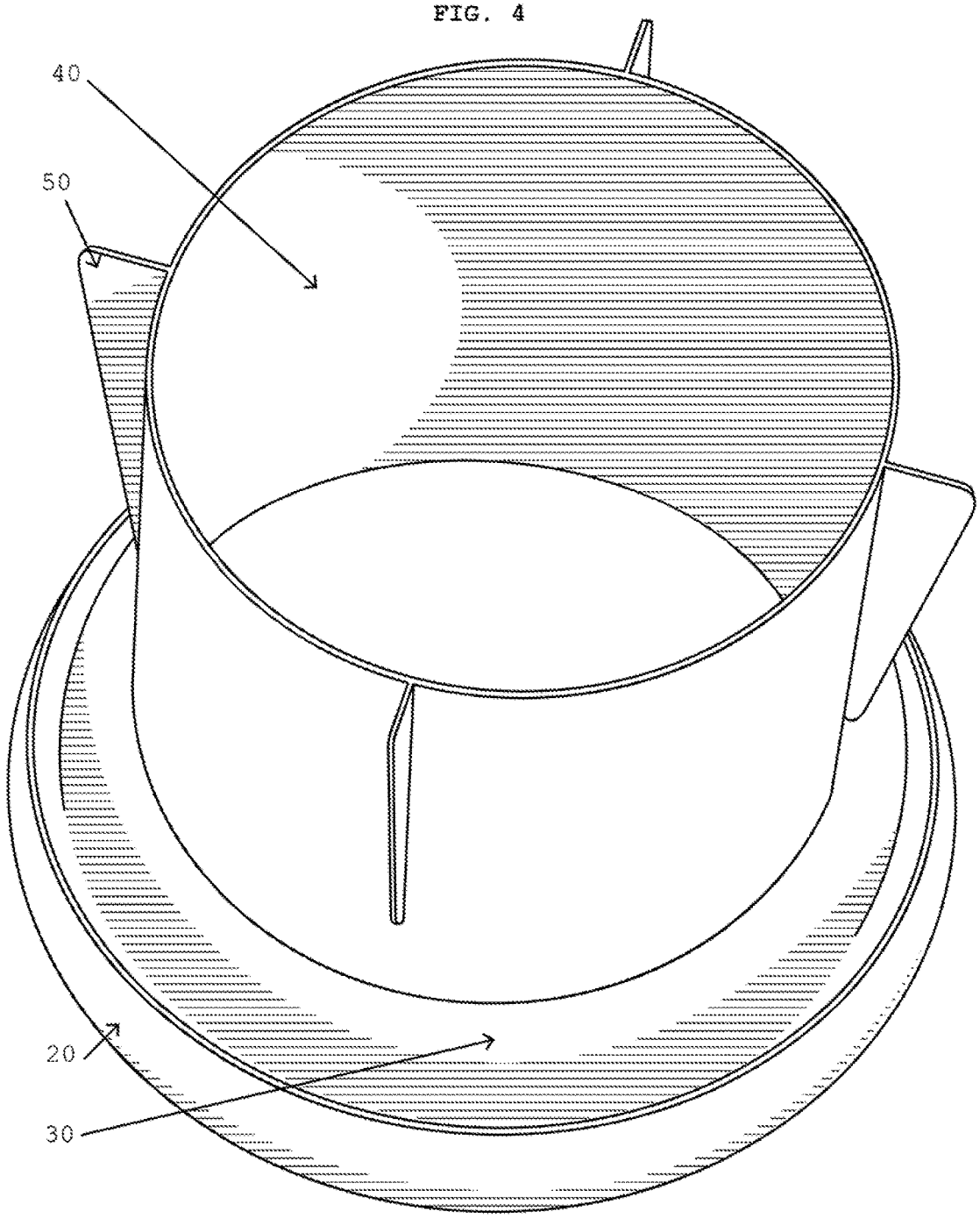
FIG. 4 is a bottom perspective view of a bottom perspective of an embodiment of the plant container watering-well aspect without the bottom perpendicular flange.

FIG. 4 is a bottom perspective view of the in-ground plant container watering-well without said bottom perpendicular flange 60.

FIG. 5 is a front detail view of an embodiment of the plant container watering-well utilizing the clear plastic cover 10 as a mini-greenhouse.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the present embodiment, what is desired to be protected by Letters Patent is presented in the subsequently appended claims.

What is claimed is:

1. A bottomless in-ground watering-well comprising: a bowl having a bottom with an aperture extending therethrough defined by a perimeter, a curved-rim circumferentially connected to a top edge of said bowl and configured to maintain said top edge above ground-level when said watering-well is in an installed position; said bowl functioning as a temporary well for water and liquids received in said bowl; a barrel circumferentially connected to said perimeter of said bowl; said barrel configured to permit downward flow of water and liquids when said watering-well is in an installed position, a lateral fin connected to an external wall of said barrel and configured to minimize rotation of said watering-well; a flange circumferentially connected to a bottom edge of said barrel and extending perpendicularly from said exterior wall of said barrel said flange configured to minimize movement in a direction of a longitudinal axis of said watering-well when said watering-well is in an installed position.

* * * * *